Sept. 25, 1951     H. BACHLI ET AL     2,568,694
PIPE BENDER
Filed April 22, 1949
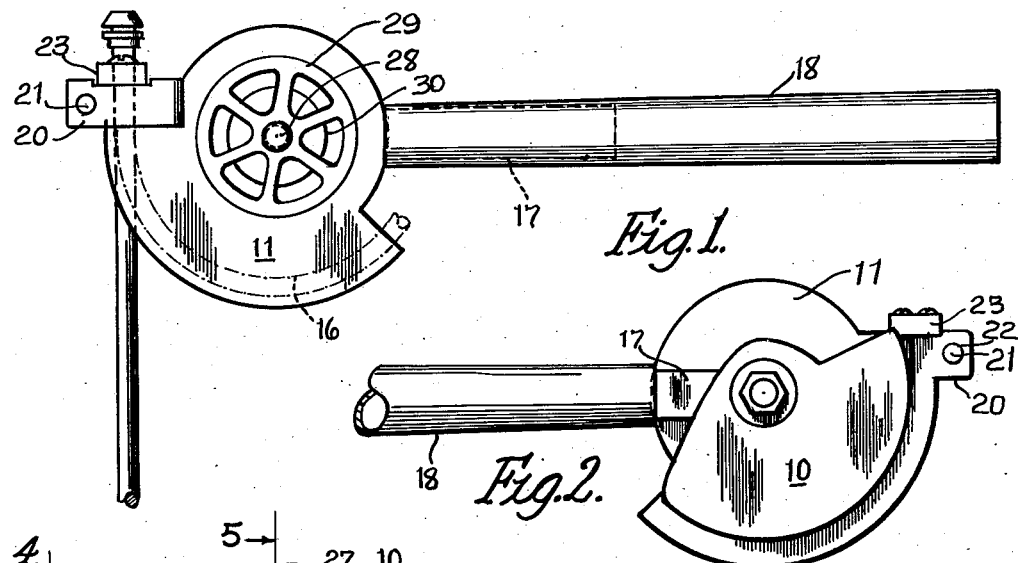
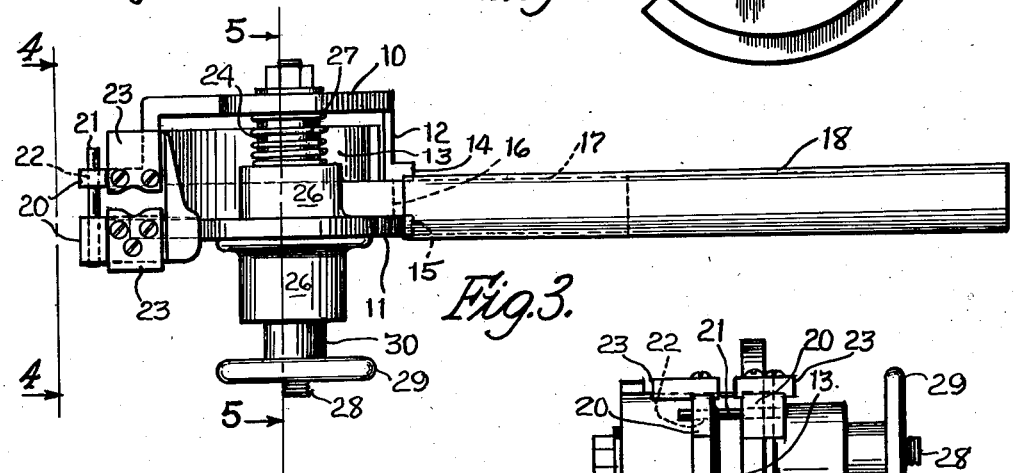
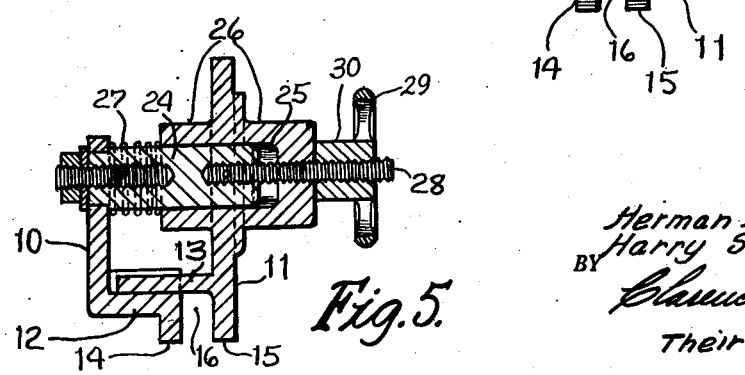
INVENTORS.
Herman Bachli and
Harry S. Shapiro
BY
Clarence E. Dhrady
Their Attorney.

Patented Sept. 25, 1951

2,568,694

UNITED STATES PATENT OFFICE 2,568,694

PIPE BENDER

Herman Bachli and Harry S. Shapiro, Chicago, Ill., assignors to Chicago Specialty Mfg. Co. Inc., Chicago, Ill., a corporation of Illinois Application April 22, 1949, Serial No. 89,083

1 Claim. (Cl. 81—15)

This invention relates to certain new and useful improvements in pipe benders.

The invention contemplates a pipe bender in which there are utilized confronting members providing therebetween a track upon which the pipe is bent and which track by lateral adjustment of the confronting members may be enlarged to accommodate within a range pipes of various diameters.

Another and equally important object of the invention is the provision for securely holding a pipe within the track during the bending operation.

Another object of the invention is to provide in a pipe bender, a holding means which clamps upon only a small area or section of the pipe, leaving the remaining portion of the pipe for free bending along the track. This arrangement prevents crimping of the pipe which otherwise results due to a clamped relation between the pipe section to be bent and the holding mechanism.

Another object of the invention is the provision of a simple and easily operable arrangement for moving and guiding the confronting members of the device relative to each other to clamp a section of the pipe in pipe bending position.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of the pipe bender embodying our invention, showing a pipe section associated therewith ready for bending in full lines, and in its bent position in phantom lines;

Fig. 2 is a fragmentary reverse side elevational view of the same without the pipe;

Fig. 3 is a top plan view of the same without the pipe;

Fig. 4 is an end view taken substantially on line 4—4 of Fig. 3; and

Fig. 5 is a sectional detail view taken substantially on line 5—5 of Fig. 3.

Our improved pipe bender comprises two confronting plates 10 and 11. These plates are provided with inwardly extending arcuate flanges 12 and 13 arranged in overlapping relation with respect to each other. Such plates are also provided with arcuate flanges 14 and 15 spaced from each other and providing together with the flange 13, a groove 16 into which a pipe moves during the bending operation. The flanges 14 and 15 serve to guide the pipe during such bending operation and are slightly spaced therefrom so as not to crimp the pipe in its bending movement.

The plate 11 provides a laterally extending stud 17 over which the end portion of a handle 18 is frictionally or otherwise fitted.

Opposite the handle 18, the plates 10 and 11 provide laterally extending lugs 20 arranged in parallel spaced relation with respect to each other. One of such lugs fixedly carries a guide pin 21 which slidably projects into an opening 22 provided by the other of the lugs. Such pin serves to guide the plates 10 and 11 in their lateral movement with respect to each other.

On the lugs 20 are secured confronting jaws 23 between which the end of the pipe is clamped and securely held during the bending operation.

The plate 10 carries a stud 24, the end of which extends into a socket 25 formed in bearings 26 provided by the plate 11. Disposed between the plate 10 and the adjacent one of the bearings 26 and embracing the stud 24 is an expansion spring 27.

Fixed to the stud 24 and extending therefrom and from the adjacent one of the bearings 26 is a screw shaft 28. Threaded on this screw shaft 28 is a hand wheel 29 having a boss 30 bearing against the adjacent one of the bearings 26. By rotating the hand wheel upon the screw shaft 28 the plates 10 and 11 will be adjusted relative to each other to clamp a pipe with its end between the jaws 23.

With the pipe clamped between the jaws and with the bender firmly held by means of the handle 18, the pipe may be bent about the track 16 without buckling or crimping.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having thus described our invention, what we claim as new and desire to protect by Letters Patent is:

A pipe bender comprising two confronting plates having inwardly extending flanges arranged in overlapping relation and provided with spaced flanges providing together with one of said first-named flanges an arcuate track, means for connecting said plates together for adjustment of said spaced flanges relative to each other, comprising a stud carried by one of said plates, a member on the other of said plates providing a socket into which said stud slidably projects, a screw shaft carried by the stud and projecting through said other plate, a hand wheel threaded upon said screw shaft, and an expansion spring on the stud between said plates, confronting jaws carried by said plates for clamping one end of a pipe to said plates at one end of the track, and a handle provided by one of said plates and adjustable therewith opposite said clamping jaws.

HERMAN BACHLI.
HARRY S. SHAPIRO.

REFERENCES CITED

The following references are of record in the file of this patent:

UNITED STATES PATENTS

| Number | Name | Date |
|---|---|---|
| 682,671 | Condon | Sept. 17, 1901 |
| 1,878,754 | Buchanan | Sept. 20, 1932 |

FOREIGN PATENTS

| Number | Country | Date |
|---|---|---|
| 705,684 | France | Mar. 16, 1931 |